April 3, 1956

G. R. DUNCAN 2,740,378

SPRAY COOLED MILK CONTAINER AND
REFRIGERATING SYSTEM THEREFOR

Filed Sept. 26, 1952

INVENTOR
GEORGE R. DUNCAN

BY Mason, Mason & Sheridan

ATTORNEY

April 3, 1956

G. R. DUNCAN 2,740,378

SPRAY COOLED MILK CONTAINER AND
REFRIGERATING SYSTEM THEREFOR

Filed Sept. 26, 1952

INVENTOR
GEORGE R. DUNCAN

BY *Mason, Mason & Sheridan*

ATTORNEY

United States Patent Office 2,740,378
Patented Apr. 3, 1956

2,740,378

SPRAY COOLED MILK CONTAINER AND REFRIGERATING SYSTEM THEREFOR

George R. Duncan, Washington, Mo., assignor to Zero Manufacturing Company, Washington, Mo., a company of Missouri Application September 26, 1952, Serial No. 311,772

10 Claims. (Cl. 119—14.09)

This invention relates to a milk cooler for cooling a container located in a refrigerator or milk cooler.

An object of the invention is to provide a milk cooler having means for cooling the sides of the milk container by forcing a spray of cooling fluid over the sides thereof.

A further object of the invention is to provide the mechanism for cooling the milk continuously by water spray means.

An additional object is to provide a bulk receptacle in a milk cooler positioned over a sump with means for providing an ice bank in said sump.

Yet another object is to provide in the construction set forth in the next penultimate paragraph, a heat exchange unit in said sump for supporting said receptacle.

A further object is to provide a serpentine passageway in said sump.

Other objects will appear hereinafter throughout the specification.

Figure 1:
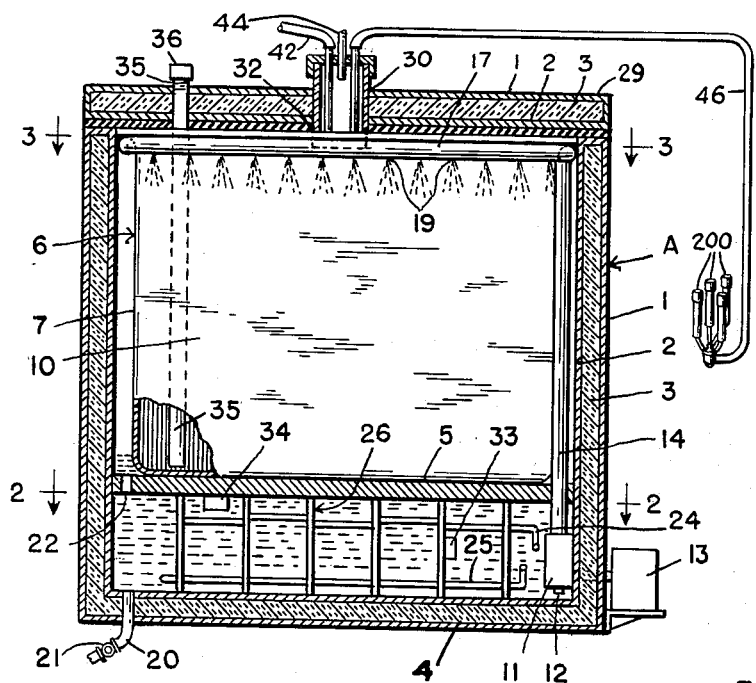
Figure 1 is a vertical section of a milk cooler and container means therefor, with parts shown in full lines.
Figure 6:
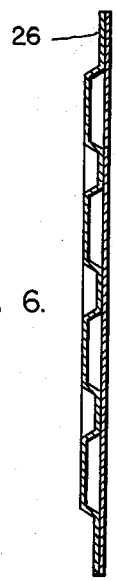
Figure 6 is a transverse section through one of the heat exchange units.
Figure 2:
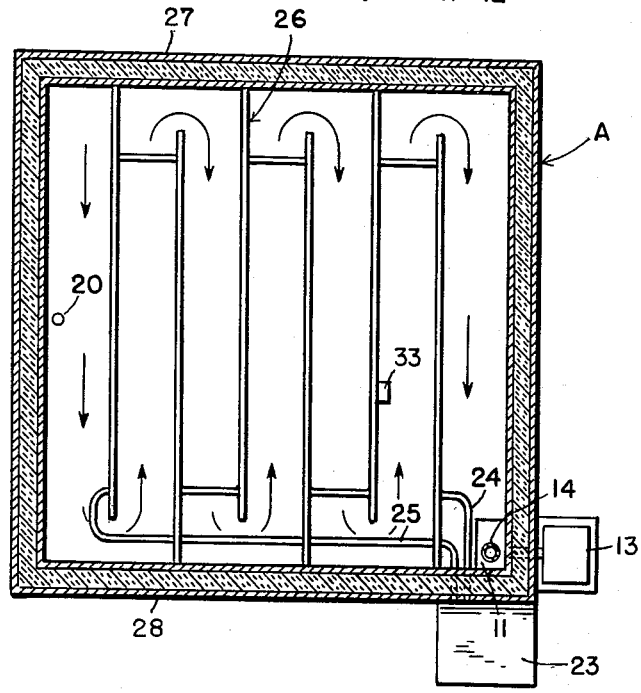
Figure 2 is a horizontal section of the structure shown in Figure 1 taken on the line 2—2 of Figure 1.

In the drawings the letter A is a milk cooler or refrigerator. This cooler is preferably provided with spaced walls 1 and 2 between which is located suitable insulation 3. The milk cooler is provided with a base 4 and a floor 5 upon which rest the milk container 6, preferably constructed of stainless steel or of aluminum or other corrosion-resistant metal. This milk container preferably is of square or oblong shape having substantially straight sides 7, 8, 9, and 10.

Figure 3:
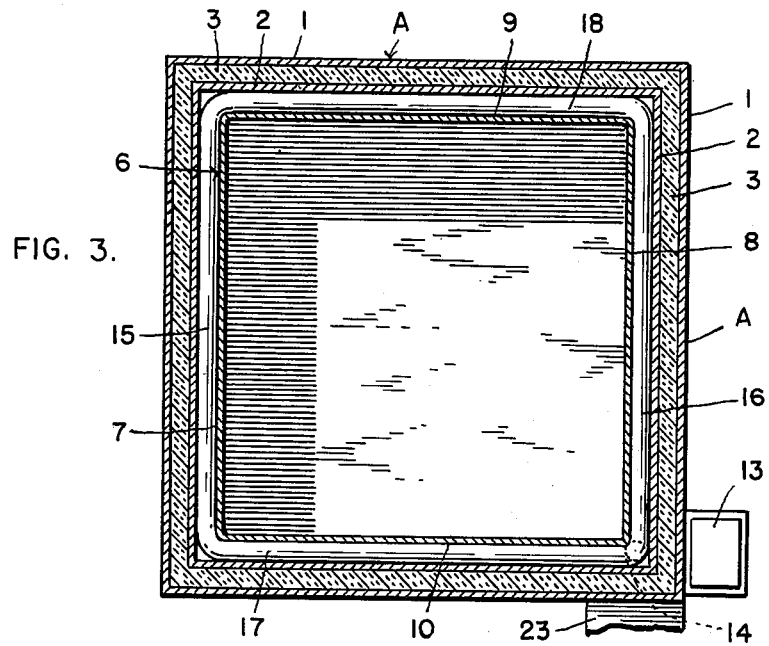
Figure 3 is a horizontal section of the structure shown in Figure 1 taken on the line 3—3 thereof.
Figure 4:
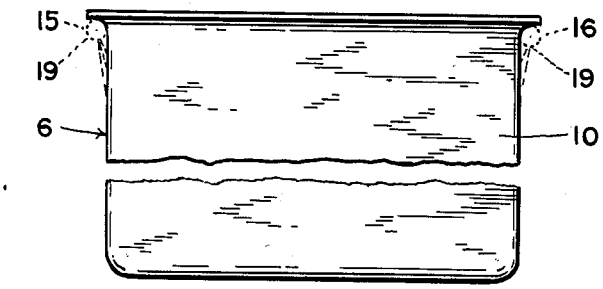
Figure 4 is a front elevation of the milk container and showing one of the spray means in dotted lines.

The space between the base 4 and the floor 5 forms a sump for the reception of chilled water. Some, at least, of this water becomes frozen during the operation of the device, thus providing an ice bank between the floor and the base. The numeral 11 indicates a pump having an inlet 12 and driven by an electric motor 13. It will be understood that the pump, although shown within the refrigerator, may be located outside of the refrigerator, the only requirement being that the inlet and outlet of the pump extends within the refrigerator. Water is drawn into the pump and forced out through the pipe 14 to the spray pipes 15, 16, 17, and 18. This pipe, as shown in Figure 3, may take the form of a single loop which extends around the four sides of the milk container 6. Each of the pipes 15 to 18, inclusive, is provided with a series of spaced perforations 19 whereby the bulk milk container may be continuously sprayed by the water which has been pumped from the space beneath the floor 5 by the pump 11, into the several spray pipes 15 to 18 and out the perforations of the same onto the sides of the milk container. The base 4 is provided with a drain pipe 20 having a valve 21 for leading the water out of the space between the case and the floor, and the floor is provided with one or more openings 22 located adjacent the leftmost wall, as seen in Figure 1, whereby water from the tank may find its way to the sump or space between the floor and the base.

Mounted on one side of the refrigerator is a refrigerating unit 23 having inlet and outlet pipes 24 and 25 connecting the refrigerating unit with heat exchange means composed of a series of offset vertical plates. These plates are constructed in accordance with the plates shown in my co-pending application filed concurrently herewith. Each alternate plate is connected to refrigerator side walls 27 and 28, located on opposite sides of the refrigerator.

Refrigerator is provided with a removable top 29 having one or more openings 30, each opening being adapted to receive a funnel-shaped conduit 31. The bulk receptacle is also provided with one or more openings 32 corresponding to opening 30, whereby milk may be poured into the receptacle by means of the funnel-shaped conduit 31.

In order to regulate the temperature of the milk and that of the interior of the milk in cooler A, thermostatic means 33 and 34 are shown in Figure 1. Conventional electrical connections lead from these thermostatic means to the refrigerating unit.

The numeral 35 indicates a suction pipe extending from above the cooler to adjacent the bottom of the bulk receptacle. The upper end is screw threaded for a closure 36, which latter may be removed and a fitting on the end of a flexible hose from a tank truck (not shown) may be attached to the end of said pipe 35. At this time the conduit 31 is removed from the opening 32, and any type of cover (not shown) may be used to seal the opening.

Figure 5:
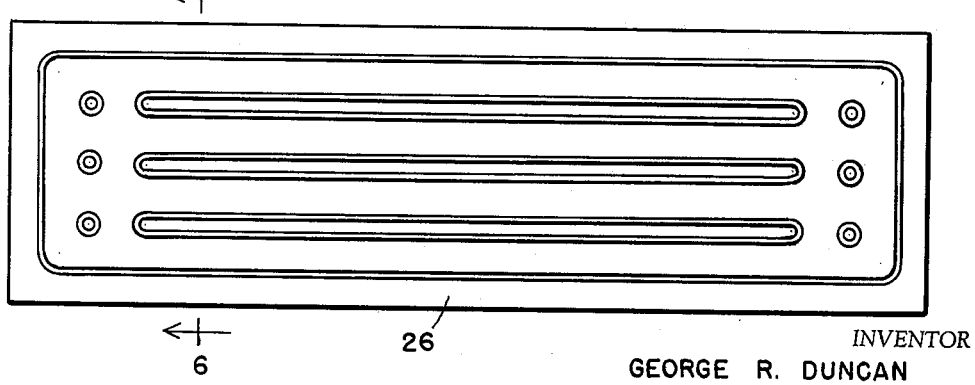
Figure 5 is a front elevation of a heat exchange unit with one of the plates removed.

The refrigerating units form a structural support for the floor 5 and the bulk milk receptacle 6. Each refrigerating unit is constructed as shown in my co-pending application filed of even date herewith, and as diagrammatically shown in Figure 5 herein.

It will be understood that there may be used with the above-described construction in place of the funnel-shaped conduit, a cover similar to that illustrated in my Patent No. 2,702,019, or the cover construction shown in Figures 3, 11, or 12 of my Patent No. 2,470,979, May 24, 1949, in which constructions there is a cover which sealingly engages the milk receptacle and through which extends the milk and vacuum conduits.

The bulk receptacle as thus sprayed with water at a temperature near the freezing point after being in contact with ice in the sump and ice which has built up on the sides of the heat exchange means 26, cools the milk rapidly in the receptacle, and is kept below 40° F.

The present refrigerator or milk cooler has a bulk milk receptacle that is not removed before, during, or after the milking operation as the milk is deposited after milking in the receptacle by being poured through the openings 30 and 32, or the milk from the animal is drawn from a set of teat cups directly into the receptacle as shown and described in my concurrently executed application, now Patent No. 2,702,019, granted February 15, 1955. Figure 1 illustrates this construction wherein the sealed cover is shown at 40, the milk conduit at 42, vacuum conduit at 44 and the second milk conduit at 46. Each milk conduit is connected to a set of teat cups as stated in the said patent, one set of which is shown at 200 in Figure 7. The milk is withdrawn from the receptacle by means of suction pipe 35 directly into a pick-up tank truck and conveyed to a creamery or other milk processing plant.

Spaces are provided as seen in Figure 1 between the sides of the receptacle and the inner sides of the cooler.

The above description and drawings disclose several embodiments of the invention, as specific language has been employed in describing the several figures. It will, nevertheless, be understood that no limitations of the scope of the invention are thereby contemplated, and that various alterations and modifications may be made such as would occur to one skilled in the art to which the invention relates.

Having thus described the invention, what is claimed as new and what is desired to be secured for Letters Patent is:

1. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle having a plurality of flat side walls, said receptacle also having top and bottom walls, said first conduit means extending into said bulk milk receptacle, said receptacle also having a second conduit means adapted to be connected to a source of vacuum whereby to apply said vacuum to said receptacle and to said teat cup means, certain of said receptacle walls extending substantially parallel with at least some of the walls of said milk cooler, means for cooling said receptacle during the milking operation including a refrigerating means and pipe means leading therefrom and having a portion located closely adjacent at least one of said walls of said receptacle, whereby to cool said receptacle by said portion of said pipe means to thereby continuously cool the milk by the circulation of a cooling medium in said pipe portion at least during the milking operation.

2. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle being rectangular with flat side walls, said receptacle also having top and bottom walls, said first conduit means extending into said bulk milk receptacle, said receptacle also having a second conduit means adapted to be connected to a source of vacuum whereby to apply said vacuum to said receptacle and to said teat cup means, certain of said receptacle walls extending substantially parallel with at least some of the walls of said milk cooler, means for cooling said receptacle during the milking operation including a refrigerating means and pipe means leading therefrom and having a portion located closely adjacent at least one of said walls of said receptacle, whereby to cool said receptacle by said portion of said pipe means to thereby continuously cool the milk by the circulation of a cooling medium in said pipe portion at least during the milking operation.

3. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle having a plurality of flat side walls, said receptacle also having top and bottom walls, said first conduit means extending into said bulk milk receptacle, said receptacle also having a second conduit means adapted to be connected to a source of vacuum whereby to apply said vacuum to said receptacle and to said teat cup means, certain of said receptacle walls extending substantially parallel with at least some of the walls of said milk cooler, means for cooling said receptacle during the milking operation including a refrigerating means and pipe means leading therefrom and having a portion located closely adjacent at least one of said walls of said receptacle, whereby to cool said receptacle by said portion of said pipe means to thereby continuously cool the milk by the circulation of a cooling medium in said pipe portion at least during the milking operation, said pipe portion extending around the sides of said milk receptacle.

4. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle being rectangular with vertical sides, said first conduit means extending into said bulk milk receptacle, said receptacle also having a second conduit means adapted to be connected to a source of vacuum whereby to apply said vacuum to said receptacle and to said teat cup means, said receptacle having walls extending substantially parallel with at least some of the walls of said milk cooler, means for cooling said receptacle during the milking operation including a refrigerating means and pipe means leading therefrom and having a portion located closely adjacent the straight vertical sides of said receptacle, whereby to cool said receptacle by said portion of said pipe means to thereby continuously cool the milk by the circulation of a cooling medium in said pipe portion at least during the milking operation, said pipe portion extending around the sides of said receptacle.

5. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle having a plurality of flat vertical sides, said first conduit means extending into said bulk milk receptacle, said receptacle also having a second conduit means adapted to be connected to a source of vacuum whereby to apply said vacuum to said receptacle and to said teat cup means, said receptacle having walls extending substantially parallel with at least some of the walls of said milk cooler, means for cooling said receptacle during the milking operation including a refrigerating means and pipe means leading therefrom and having a portion located closely adjacent the straight vertical sides of said receptacle, whereby to cool said receptacle by said portion of said pipe means to thereby continuously cool the milk by the circulation of a cooling medium in said pipe portion at least during the milking operation, said pipe portion extending around the sides of said milk receptacle, said pipe portion including a plurality of angular members extending parallel to the vertical sides of said receptacle.

6. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle being rectangular with vertical sides, said first conduit means extending into said bulk milk receptacle, said receptacle also having a second conduit means adapted to be connected to a source of vacuum whereby to apply said vacuum to said receptacle and to said teat cup means, said receptacle having walls extending substantially parallel with at least some of the walls of said milk cooler, means for cooling said receptacle during the milking operation including a refrigeration means and pipe means leading therefrom and having a portion located closely adjacent the straight vertical sides of said receptacle, whereby to cool said receptacle by said portion of said pipe means to thereby continuously cool the milk by the circulation of a cooling medium in said pipe portion at least during the milking operation, said pipe portion extending around the sides of said milk receptacle, said pipe portion including a plurality of angular members extending parallel to the vertical sides of said receptacle.

7. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle having a plurality of flat vertical sides, said first conduit means extending into said bulk milk receptacle, said receptacle also having a second conduit means adapted to be connected to a source of vacuum whereby to apply said vacuum to said receptacle and to said teat cup means, said receptacle having walls extending substantially parallel with at least some of the walls of said milk cooler, means for cooling said receptacle during the milking operation including a refrigerating means and pipe means leading therefrom and having a portion located closely adjacent the straight vertical sides of said receptacle, whereby to cool said receptacle by said portion of said pipe means to thereby continuously cool the milk by the circulation of a cooling medium in said pipe portion at least during the milking operation, said pipe portion extending around the sides of said milk receptacle, said pipe portion including a plurality of angular members extending parallel to the vertical sides of said receptacle, said angular pipe members having a plurality of apertures for directing said cooling medium from said pipe members onto the said vertical sides of said receptacle.

8. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle being rectangular with vertical sides, said first conduit means extending into said bulk milk receptacle, said receptacle also having a second conduit means adapted to be connected to a source of vacuum whereby to apply said vacuum to said receptacle and to said teat cup means, said receptacle having walls extending substantially parallel with at least some of the walls of said milk cooler, means for cooling said receptacle during the milking operation including a refrigeration means and pipe means leading therefrom and having a portion located closely adjacent the straight vertical sides of said receptacle, whereby to cool said receptacle by said portion of said pipe means to thereby continuously cool the milk by the circulation of a cooling medium in said pipe portion at least during the milking operation, said pipe portion extending around the sides of said milk receptacle, said pipe portion including a plurality of angular members extending parallel to the vertical sides of said receptacle, said angular pipe members having a plurality of apertures for directing said cooling medium onto the said vertical sides of said receptacle.

9. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle having a plurality of flat vertical sides, said first conduit means extending into said bulk milk receptacle, said receptacle also having a second conduit means adapted to be connected to a source of vacuum whereby to apply said vacuum to said receptacle and to said teat cup means, said receptacle having walls extending substantially parallel with at least some of the walls of said milk cooler, means for cooling said receptacle during the milking operation including a refrigerating means and pipe means leading therefrom and having a portion located closely adjacent the straight vertical sides of said receptacle, whereby to cool said receptacle by said portion of said pipe means to thereby continuously cool the milk by the circulation of a cooling medium in said pipe portion at least during the milking operation, said pipe portion extending around the sides of said milk receptacle, said pipe portion including a plurality of angular members extending parallel to the vertical sides of said receptacle, said angular pipe members having a plurality of apertures for directing said cooling medium from said pipe members onto the said vertical sides of said receptacle, and a sump for said cooling medium in said milk cooler, and a pump having an inlet in said sump and an outlet connected to said refrigerating means and to said pipe means.

10. In a system for milking a farm animal and for cooling and storing the milk in a bulk receptacle as it comes from the animal, comprising milking means including teat cup means and first conduit means extending therefrom, a milk cooler having insulating walls, a bulk milk vacuum receptacle in said cooler, said bulk milk receptacle being rectangular with vertical sides, said first conduit means extending into said bulk milk receptacle, said receptacle also having a second conduit means adapted to be connected to a source of vacuum whereby to apply said vacuum to said receptacle and to said teat cup means, said receptacle having walls extending substantially parallel with at least some of the walls of said milk cooler, means for cooling said receptacle during the milking operation including a refrigeration means and pipe means leading therefrom and having a portion located closely adjacent the straight vertical sides of said receptacle, whereby to cool said receptacle by said portion of said pipe means to thereby continuously cool the milk by the circulation of a cooling medium in said pipe portion at least during the milking operation, said pipe portion extending around the sides of said milk receptacle, said pipe portion including a plurality of angular members extending parallel to the vertical sides of said receptacle, said angular pipe members having a plurality of apertures for directing said cooling medium onto the said vertical sides of said receptacle, and a sump for said cooling medium in said milk cooler, and a pump having an inlet in said sump and an outlet connected to said refrigerating means and to said pipe means.

References Cited in the file of this patent

UNITED STATES PATENTS

| | | |
|---|---|---|
| 1,925,120 | Tamminga | Sept. 5, 1933 |
| 2,140,744 | Hirsch | Dec. 20, 1938 |
| 2,538,015 | Kleist | Jan. 16, 1951 |
| 2,538,016 | Kleist | Jan. 16, 1951 |
| 2,610,035 | Wennlund | Sept. 9, 1952 |